US012562523B2

(12) United States Patent
Tanaka et al.

(10) Patent No.: US 12,562,523 B2
(45) Date of Patent: Feb. 24, 2026

(54) WATERPROOF TERMINAL BLOCK

(71) Applicant: Yazaki Corporation, Tokyo (JP)

(72) Inventors: Yasuhiro Tanaka, Shizuoka (JP); Yasuhiro Otsuta, Shizuoka (JP); Masatoshi Yamada, Shizuoka (JP); Shogo Furui, Shizuoka (JP); Yusuke Tsutagawa, Shizuoka (JP); Jun Sugioka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 311 days.

(21) Appl. No.: 18/521,477

(22) Filed: Nov. 28, 2023

(65) Prior Publication Data

US 2024/0178608 A1 May 30, 2024

(30) Foreign Application Priority Data

Nov. 30, 2022 (JP) ................................. 2022-191664
Aug. 30, 2023 (JP) ................................. 2023-139878

(51) Int. Cl.
*H01R 13/52* (2006.01)
*H01R 9/24* (2006.01)

(52) U.S. Cl.
CPC ........... *H01R 13/5202* (2013.01); *H01R 9/24* (2013.01)

(58) Field of Classification Search
CPC ... H01R 12/718; H01R 12/57; H01R 2201/16
USPC ......................................................... 439/519
See application file for complete search history.

(56) References Cited

U.S. PATENT DOCUMENTS

| | | | | |
|---|---|---|---|---|
| 7,077,676 B2 * | 7/2006 | Matsumoto | H01R 13/521 439/271 |
| 8,128,431 B2 * | 3/2012 | Kato | H01R 13/521 439/271 |
| 8,562,381 B2 * | 10/2013 | Kawamura | H01R 11/12 439/801 |
| 9,281,627 B2 * | 3/2016 | Fujiwara | H01R 13/6581 |
| 9,570,899 B2 * | 2/2017 | Tanaka | H02G 15/013 |
| 10,361,503 B2 * | 7/2019 | Motohashi | H01R 13/5208 |
| 10,897,105 B2 * | 1/2021 | Iizuka | H01R 13/533 |
| 11,217,933 B2 * | 1/2022 | Aoki | H01R 13/5208 |
| 11,456,560 B2 * | 9/2022 | Masuda | H01R 13/424 |
| 11,705,665 B2 * | 7/2023 | Masuda | H01R 13/506 439/271 |
| 11,769,960 B2 * | 9/2023 | Masuda | H01R 13/5202 439/345 |

(Continued)

FOREIGN PATENT DOCUMENTS

JP 2021-163719 A 10/2021

*Primary Examiner* — Harshad C Patel
(74) *Attorney, Agent, or Firm* — Sughrue Mion, PLLC

(57) ABSTRACT

A waterproof terminal block includes a housing, a plurality of terminals configured to be inserted into and attached to the plurality of terminal insertion holes of the housing, a packing, and a holder fitted into a holder configured to be assembled to the housing and hold the packing. The housing has a cutting blade part at a partition wall partitioning an upper section of the housing into a plurality of packing fitting recess. The packing is integrally formed by connecting sealing parts of the plurality of sealing parts with a connecting parts. The cutting blade part is configured to cut the connecting parts when the plurality of terminals, the packing, and the holder are assembled to the housing.

7 Claims, 11 Drawing Sheets

(56) References Cited

U.S. PATENT DOCUMENTS

| | | | | |
|---|---|---|---|---|
| 12,027,809 | B2 * | 7/2024 | Giambrone | H05K 7/14322 |
| 12,155,144 | B2 * | 11/2024 | Nagayama | H01R 4/34 |
| 2014/0287631 | A1 * | 9/2014 | Tashiro | H01R 13/5216<br>439/733.1 |
| 2015/0144395 | A1 * | 5/2015 | Tanaka | H02G 3/22<br>174/668 |

* cited by examiner

WATERPROOF TERMINAL BLOCK

CROSS-REFERENCE TO RELATED APPLICATIONS

The present application is based upon and claims the benefit of priority from Japanese Patent Applications No. 2023-139878, filed on Aug. 30, 2023, and No. 2022-191664, filed on Nov. 30, 2022, the entire contents of which are incorporated herein by reference.

TECHNICAL FIELD

The present disclosure relates to a waterproof terminal block.

BACKGROUND

A waterproof terminal block is described in Japanese Patent Publication No. 2021-163719 (Patent Document 1). This waterproof terminal block has a housing in which a plurality of terminal insertion holes are formed through which a plurality of terminals are inserted. A packing having a plurality of sealing parts in which each sealing part is annular for sealing between each connection plate part of the plurality of terminals and the plurality of terminal insertion holes is fitted into each hole part formed in an upper part of the plurality of terminal insertion holes as a sealing member. The packing is held by a holder assembled to the housing.

SUMMARY

The waterproof terminal block described in Patent Document 1 uses the packing formed integrally by connecting the plurality of sealing parts at the upper part. Therefore, in a case where the plurality of terminals which are multipolar are respectively sealed for each seal part (each phase), in the case where the sealing parts are connected to each other, the effect of the dimensional tolerance of each phase cannot be ignored in other phases, and the sealing performance may deteriorate and a waterproof failure may occur. In addition, in a case where the packing is individually made for each phase, a number of assembly man-hours may increase, or the packing may be forgotten or may be double-filled.

An object of the present disclosure is to provide a waterproof terminal block capable of improving waterproofness and assemblability.

A waterproof terminal block according to one or more embodiments includes a housing, a plurality of terminals, a packing, and a holder. The housing has a plurality of terminal insertion holes formed at a lower side of the housing and a plurality of packing fitting recesses partitioned by a partition wall at an upper side of the housing. The plurality of terminals are configured to be inserted into and attached to the plurality of terminal insertion holes. The packing has a plurality of sealing parts configured to seal the plurality of terminals inserted into the plurality of sealing parts and to fit into the plurality of packing fitting recesses, each sealing part having an annular shape. The holder has a plurality of terminal inserting parts separated by a separation part, each terminal insertion part having an annular shape, and configured to hold the packing by bringing the plurality of terminal insertion parts into contact with the packing from the upper side. The packing has connecting parts connecting adjacent sealing parts of the plurality of sealing parts to each other to be formed integrally. The partition wall has a cutting blade part configured to cut a connecting part of the connecting parts of the packing when assembling the plurality of terminals, the packing, and the holder to the housing.

According to the above configuration, it is possible to provide a waterproof terminal block capable of improving waterproofness and assemblability.

DETAILED DESCRIPTION

Various embodiments will be described hereinafter with reference to the accompanying drawings.

Hereinafter, a waterproof terminal block according to each embodiment will be described in detail with reference to the drawings.

First Embodiment

Figure 1:
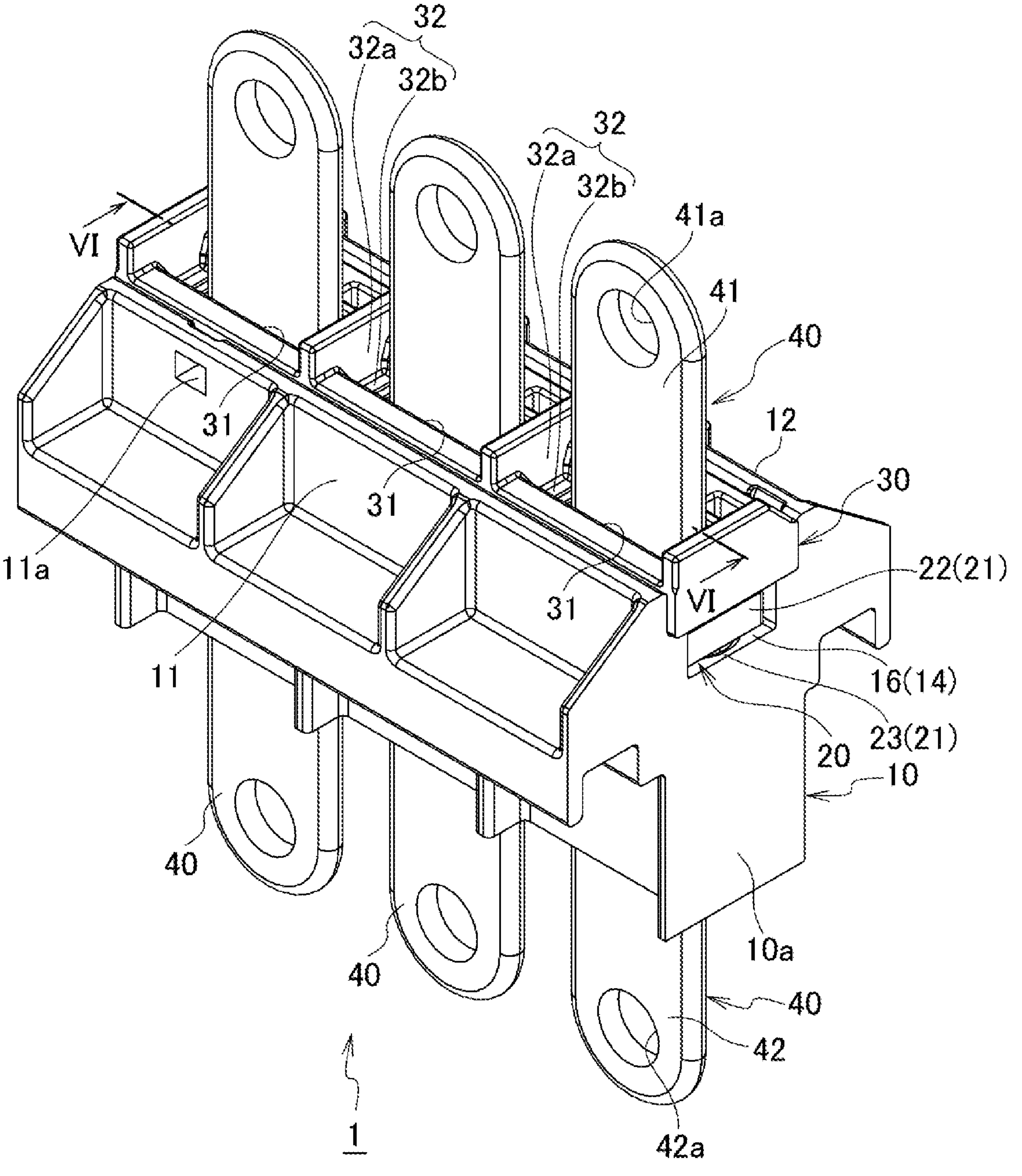
FIG. 1 is a perspective view of a waterproof terminal block according to first embodiment.
Figure 2:
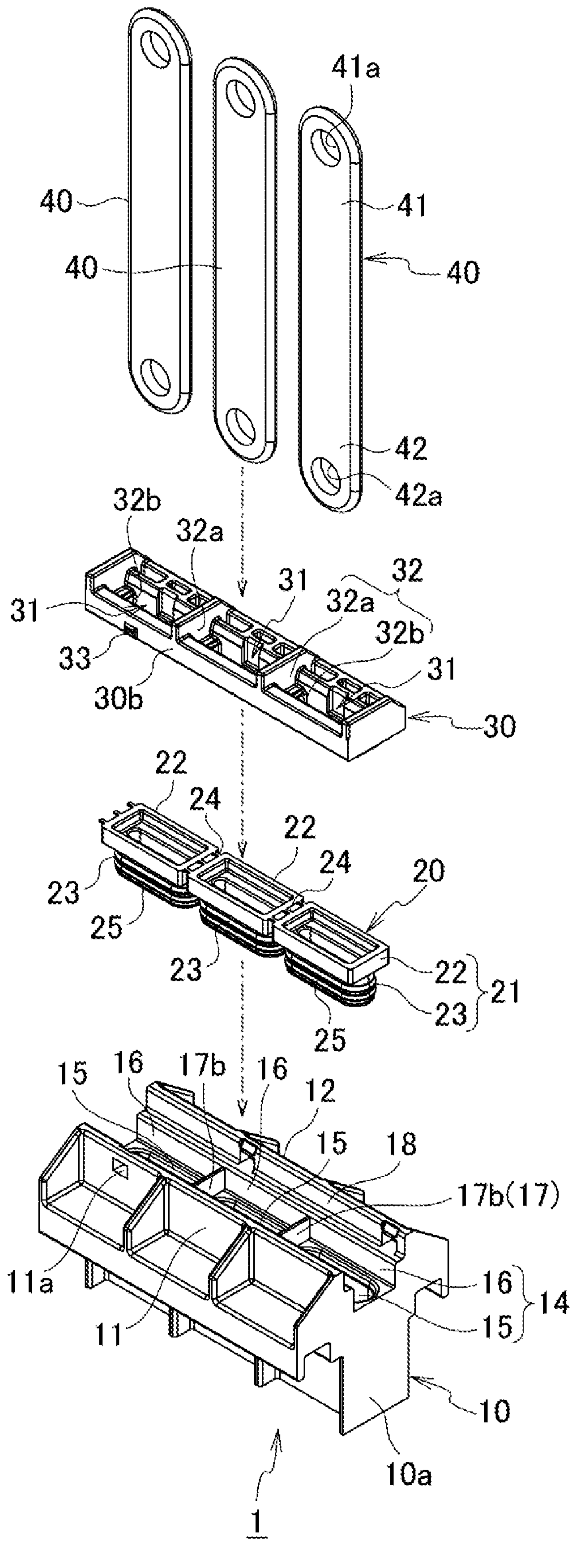
FIG. 2 is an exploded perspective view of the waterproof terminal block according to the first embodiment.
Figure 3:
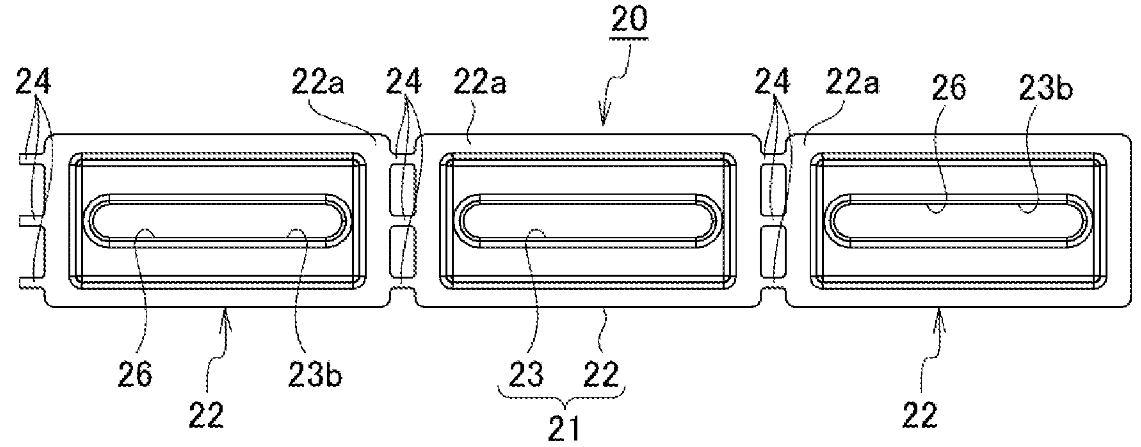
FIG. 3 is a plan view of a packing used for the waterproof terminal block according to the first embodiment.
Figure 4:
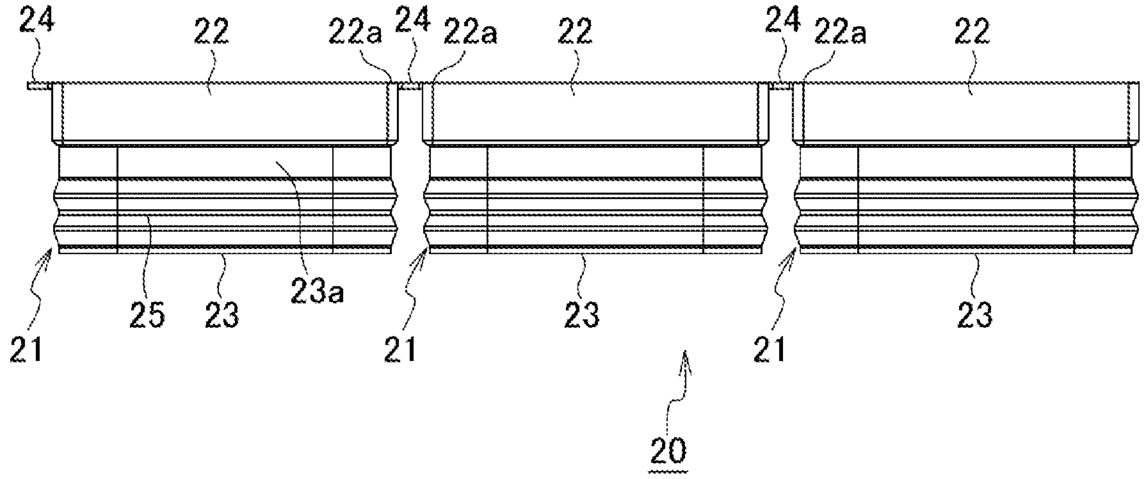
FIG. 4 is a front view of the packing according to the first embodiment.
Figure 5:
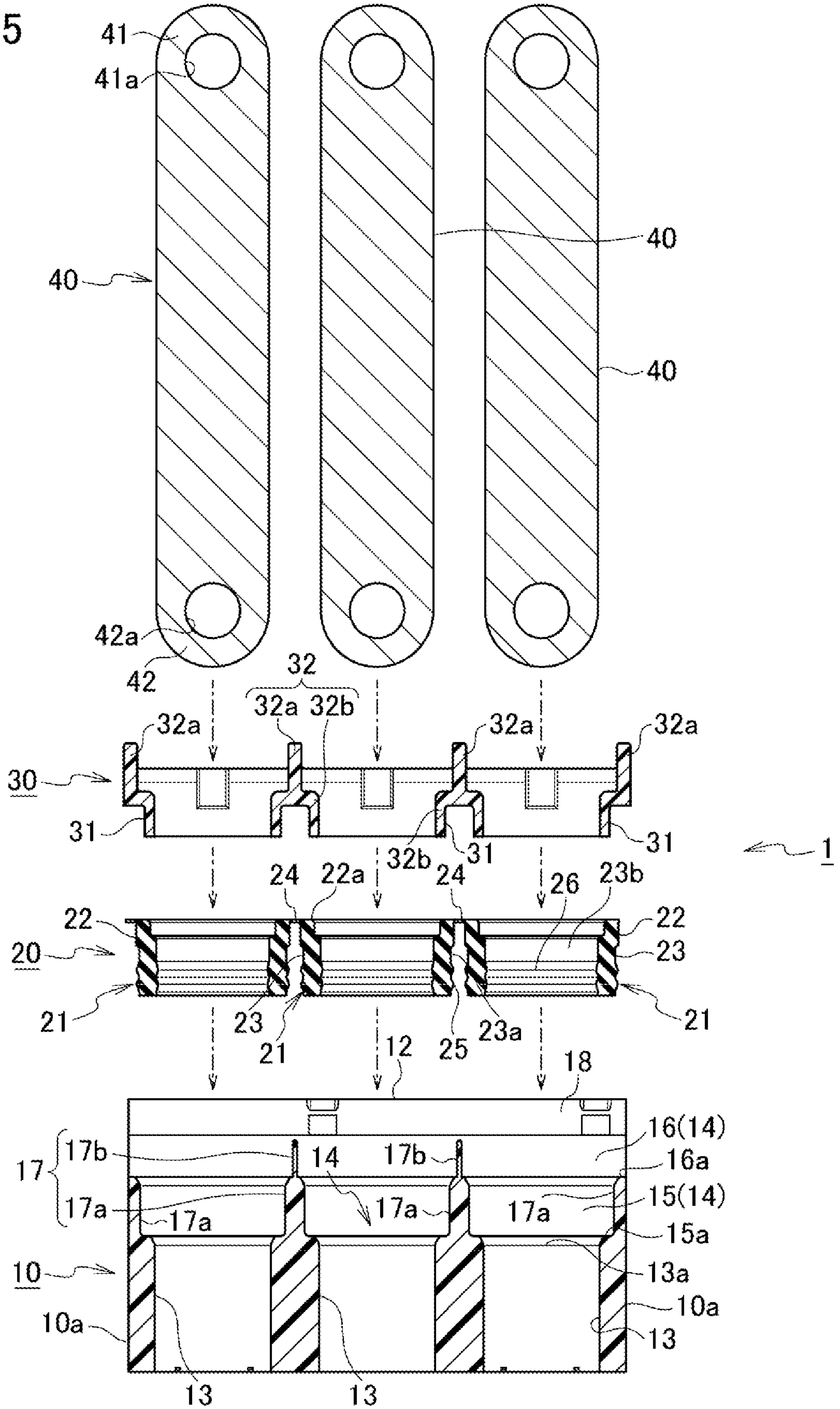
FIG. 5 is a cross-sectional view of the waterproof terminal block according to the first embodiment before assembly.
Figure 6:
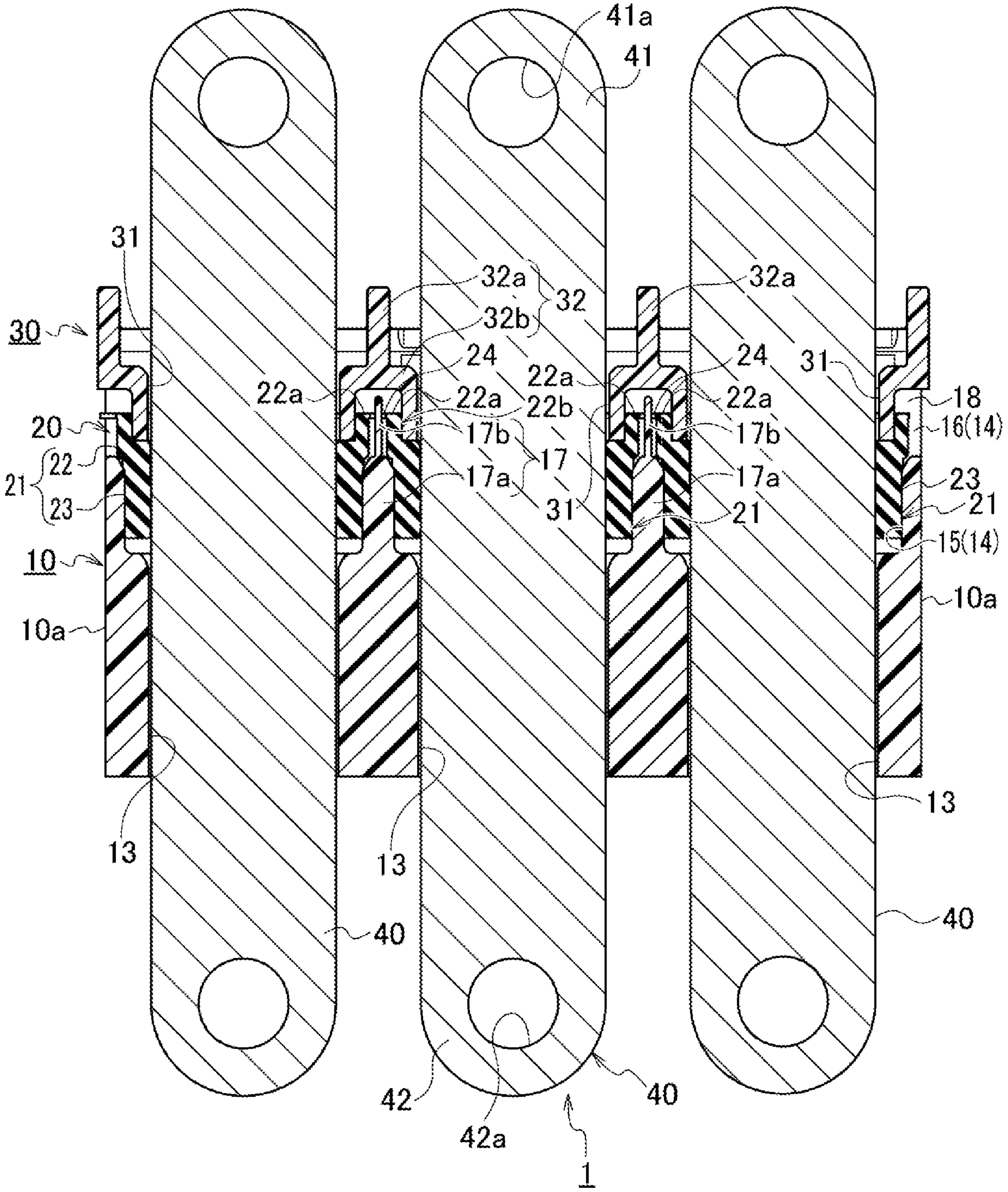
FIG. 6 is a cross-sectional view along a line VI-VI in FIG. 1.

FIG. 1 is a perspective view of a waterproof terminal block 1 according to first embodiment. FIG. 2 is an exploded perspective view of the waterproof terminal block 1. FIG. 3 is a plan view of a packing 20 used for the waterproof terminal block 1. FIG. 4 is a front view of the packing 20. FIG. 5 is a cross-sectional view of the waterproof terminal block 1 before assembly. FIG. 6 is a cross-sectional view along a line VI-VI illustrated in FIG. 1.

The waterproof terminal block 1 includes a housing 10 made of synthetic resin, the packing 20 as a sealing member, a holder 30 made of synthetic resin, and three terminals 40. The waterproof terminal block 1 is provided, for example, on an object to be mounted (not illustrated) such as a case, such as a drive motor device mounted on an electric vehicle.

The housing 10 includes, from a lower side to an upper side, three terminal insertion holes 13, three packing fitting recesses 14 separated from each other by partition walls 17 and each packing fitting recess 14 having a lower part 15 and an upper part 16, and a holder fitting recess 18. The partition wall 17 has a first partition wall section 17*a*, which is a thick-walled section, and a second partition wall section 17*b* thinner than the first partition wall section 17*a* projected from an upper end of the first partition wall section 17*a*.

The three terminal insertion holes 13 are formed so that the terminals 40 can be inserted in parallel at equal intervals between side surfaces 10*a* of the housing 10 so as to be penetrated in a vertical (up-down) direction.

The lower part 15 for each of the three packing fitting recesses 14 are demarcated by the first partition wall section 17*a*, and are formed in the shape of elliptical holes in a cross section through a step elliptical parts 15*a* at an upper edge 13*a* of the terminal insertion holes 13. Furthermore, the upper parts 16 of the three packing fitting recesses 14 are demarcated by a second partition wall section 17*b*, and are formed in a shape of rectangular holes in a cross section through the step elliptical parts 16*a* at the upper edge of the lower parts 15. Each of the second partition wall sections 17*b* demarcating the upper parts 16 of the three packing fitting recesses 14 serves as a cutting blade part for cutting a strip-shaped connecting parts 24 connecting an upper ends 22*a* of adjacent sealing parts 21 of the packing 20, which will be described later.

The holder fitting recesses 18 are formed so as to fit the packing 20 between a front wall 11 and a rear wall 12 of the housing 10. A rectangular locking hole 11*a* configured to lock a locking projection 33 of the holder 30 fitted in the holder fitting recesses 18 is formed in the front wall 11.

The packing 20 is configured to fit into the packing fitting recesses 14 of the housing 10 from the upper side. The packing 20 is molded from a flexible resin material such as rubber, for example, and has three sealing parts 21, each sealing part having annular shape, into which the terminals 40 are inserted and sealed. Each of the three annular sealing parts 21 has a frame part 22 with a rectangular annular shape, an elliptical annular part 23 integrally formed on the lower side of the frame part 22 into which the terminals 40 are inserted and sealed, and three connecting parts 24 with a strip-shaped connecting center and both sides between upper ends 22*a* of adjacent frame parts 22. That is, the packing 20 is integrally formed by connecting the upper ends 22*a* of the adjacent frame parts 22 with three strip shaped connecting parts 24 located in the center and both sides. As illustrated in FIGS. 5 and 6, the frame part 22 of the sealing part 21 is configured to fit into the upper part 16 of the packing fitting recess 14, and the elliptical annular part 23 is configured to fit into the lower part 15 of the packing fitting recess 14.

The elliptical annular part 23 has an outer lip part 25 and an inner lip part 26. The outer lip part 25 is provided on an outer peripheral surface 23*a* and comes into close contact with the lower part 15 of the packing fitting recess 14 of the housing 10 when the packing 20 is assembled to the housing 10. The inner lip part 26 is provided on an inner peripheral surface 23*b* and comes into close contact with the terminal 40 when the terminal 40 is assembled to the packing 20. The packing 20 having the three sealing parts 21 is divided into each packing 20 by cutting third strip-shaped connecting parts 24 illustrated in FIGS. 3 and 4 from a member in which a plurality of annular sealing parts 21 are connected by the strip-shaped connecting parts 24.

The holder 30 is formed in a rectangular cylindrical shape by a synthetic resin. The holder 30 is provided with three terminal insertion parts 31 in parallel, each terminal insertion part 31 having an annular shape, which are divided by an upper separation protrusion 32*a* and a lower separation recess 32*b* of a separation part 32, and into which the terminals 40 are inserted. As illustrated in FIG. 6, the lower side of the annular terminal insertion parts 31 is configured to fit into the frame part 22 of the annular sealing parts 21, and the upper side of the annular terminal insertion part 31 is configured to fit into the holder fitting recess 18 to hold the packing 20. Here, the lower side of the terminal insertion part 31 is synonymous with the side of the lower separation recess 32*b*. The upper side of the terminal insertion part 31 is synonymous with the side of the upper separation protrusion 32*a*. As illustrated in FIG. 2, a front surface 30*b* of the holder 30 is formed with the locking projection 33 engaged and disengaged with the rectangular locking hole 11*a* formed in the front wall 11 of the housing 10. A state in which the holder 30 is fitted into the holder fitting recess 18 of the housing 10 to hold the packing 20 is maintained by engaging the locking projection 33 with the rectangular locking hole 11*a*.

The terminals 40 inserted into and attached to the three terminal insertion holes 13 of the housing 10 are formed of a conductive metal material such as copper or copper alloy, for example, and are plate-like bus bars. An upper end of the plate-like terminal 40 is a connection part 41 in which connection hole 41*a* is formed, and a lower end of the plate-like terminal 40 is 42 in which connection hole 42*a* is formed. A method for fixing the terminal 40 will be omitted.

Next, the effect of the waterproof terminal block 1 will be described.

The waterproof terminal block 1 includes the housing 10 having the plurality of terminal insertion holes 13 and the plurality of packing fitting recesses 14 separated by the partition wall 17 from a lower side to an upper side, and a plurality of terminals 40 inserted into and attached to the plurality of terminal insertion holes 13. The waterproof terminal block 1 includes a packing 20 as a scaling member, which has a plurality of annular sealing parts 21 into which the terminals 40 are inserted and sealed, and which are fitted into the packing fitting recesses 14. The waterproof terminal block 1 also includes the holder 30 having the plurality of annular terminal insertion parts 31 separated by the separation parts 32, and holding the packing 20 by bringing the terminal insertion parts 31 into contact with the upper part of the packing 20. The housing 10 has the cutting blade part which is, for example, a second partition wall section 17*b* of the partition wall 17. The packing 20 is integrally formed by connecting each frame part 22 of the plurality of sealing parts 21 with the connecting part 24. When the terminal 40, the packing 20, and the holder 30 are assembled to the housing 10, the connecting part 24 is cut by the cutting blade part.

In the waterproof terminal block 1, the partition wall 17 of the housing 10 may have the first partition wall section 17*a*, which is the thick-walled section, and the second partition wall section 17*b*, which is thinner than the first partition wall section 17*a*. The separation part 32 of the holder 30 may have the upper separation protrusion 32*a* and the lower separation recess 32*b*. The connecting part 24 may be cut by the cutting blade part entering the lower separation recess 32*b* while a peripheral part 22*b* connected by the connecting part 24 of the adjacent sealing part 21 of the packing 20 is held sandwiched in the lower separation recess 32*b* between two adjacent terminal insertion parts 31 of the holder 30. The cutting blade part is the second partition wall section 17*b*.

Further, in the waterproof terminal block 1, the plurality of sealing parts 21 of the packing 20 may have the outer lip part 25 on the outer peripheral surface 23*a* that is in close contact with the packing fitting recess 14 of the housing 10, and the inner lip part 26 on the inner peripheral surface 23*b* that is in close contact with the terminal 40.

According to the present embodiment, when the terminal 40, the packing 20, and the holder 30 are assembled to the housing 10, the strip-shaped connecting parts 24 connecting the annular sealing parts 21 of the packing 20 are cut by the respective second partition wall section 17*b* that demarcate the packing fitting recess 14. That is, the peripheral part 22*b* connected by the strip-shaped connecting part 24 of each annular sealing parts 21 is sandwiched and held in the lower separation recess 32*b* between each annular terminal insertion part 31 of the holder 30, and the strip-shaped connecting part 24 is cut by the second partition wall section 17*b* entering the lower separation recess 32*b*. At this time, since the peripheral part 22*b* of the strip-shaped connecting part 24 is sandwiched and held in the lower separation recess 32*b*, the strip-shaped connecting part 24 can be easily and surely cut by the second partition wall section 17*b* entering the lower separation recess 32*b*. Further, since the peripheral part 22*b* of the strip-shaped connecting part 24 is sandwiched in the lower separation recess 32*b* and the strip-shaped connecting part 24 is cut by the second partition wall section 17*b*, the cut end of the strip-shaped connecting part 24 does not fall on the seal surface side of the outer lip part 25 or the inner lip part 26 of the scaling part 21.

When the waterproof terminal block 1 is assembled, the elliptical annular part 23 of the annular sealing part 21 of the packing 20 is fitted or press-fitted into the lower part 15 of the packing fitting recess 14 of the housing 10, and the terminal 40 is fitted or press-fitted into the elliptical annular part 23. By these press-fits, the outer lip part 25 of the elliptical annular part 23 comes into close contact with the lower part 15 of the packing fitting recess 14, and the inner lip part 26 comes into close contact with the terminal 40, thereby achieving high waterproofness.

By cutting the belt-like connecting part 24 between the annular sealing parts 21 of the packing 20 at the time of assembling the waterproof terminal block 1, an influence of dimensional tolerance of the annular sealing parts 21 can be completed in each phase, and a robustness of waterproofing function can be improved. By improving the robustness, a crushing margin of the packing 20 can be made smaller than that of the conventional structure in which the multiple phases are integrated, so that an insertion force of the terminal 40 and the like can be reduced, and the packing 20 can be prevented from falling down, biting, and peeling due to the insertion of the terminal. Thus, the waterproofness and the assemblability of the waterproof terminal block 1 can be further improved.

In the waterproof terminal block 1, the connecting part 24 may have strip shape extending along a direction in which the plurality of scaling parts 21 are aligned.

According to the waterproof terminal block 1, the connecting part 24 can be more easily cut by the second partition wall section 17*b* as the cutting blade part.

Second Embodiment

In the waterproof terminal block 1 according to the first embodiment, when the packing 20 and the holder 30 are assembled to the housing 10, each second partition wall section 17*b*, which is a part of the housing 10, cuts the connecting part 24 connecting sealing parts 21 adjacent to each other in the packing 20. The structure or shape for cutting the connecting part 24 is not limited to the structure or shape of the second partition wall section 17*b*, but may be modified as follows, for example.

Figure 7:
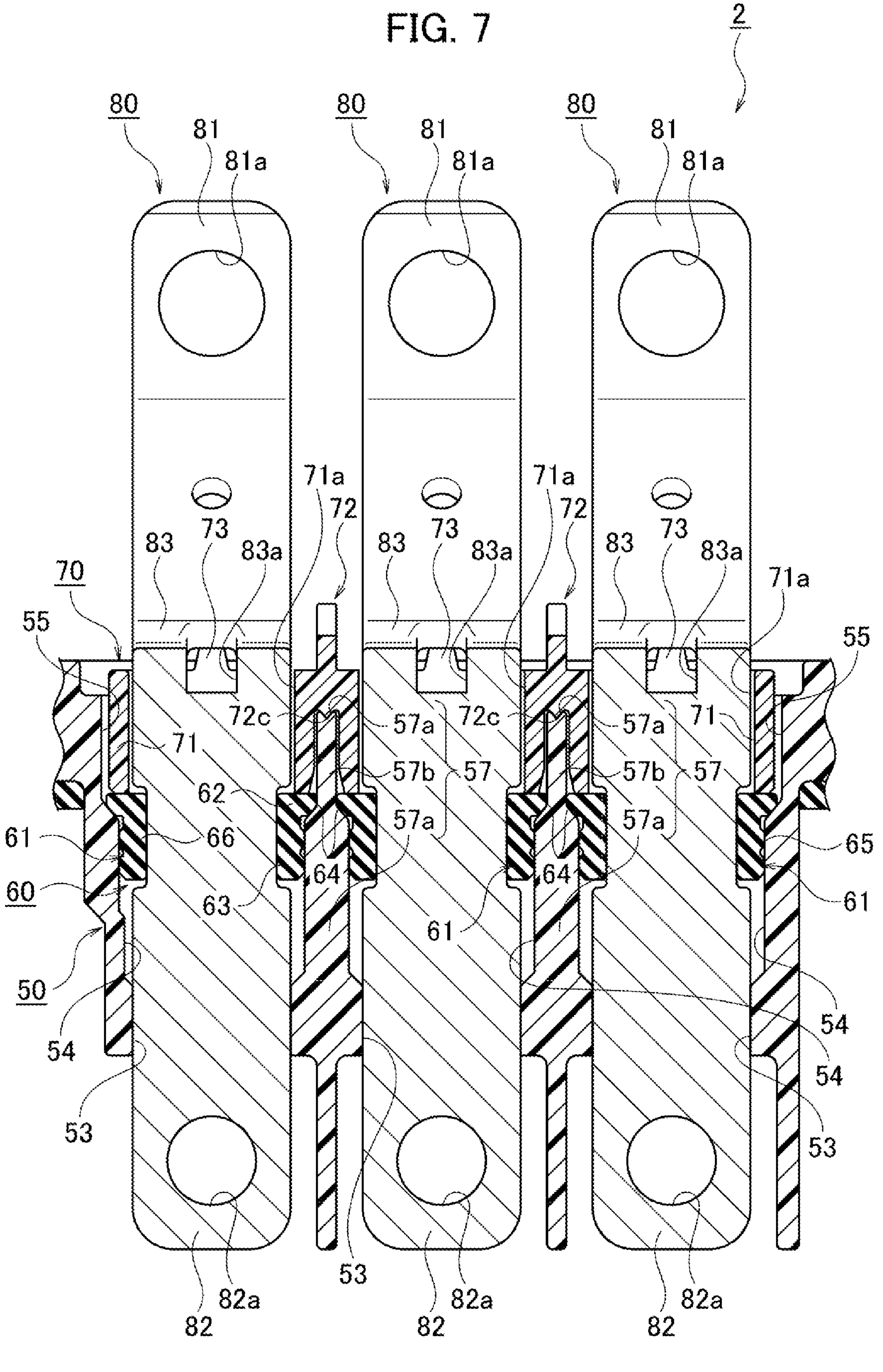
FIG. 7 is a cross-sectional view of a waterproof terminal block according to second embodiment.

FIG. 7 is a cross-sectional view of a waterproof terminal block 2 according to a second embodiment. FIG. 7 is a cross-sectional view of the waterproof terminal block 2, which is a cross-sectional view of a cross-sectional position equivalent to the cross-sectional position of the waterproof terminal block 1 according to the first embodiment illustrated in FIG. 6.

The waterproof terminal block 2 includes a housing 50 made of synthetic resin, a packing 60 as a sealing member, a holder 70 made of synthetic resin, and three terminals 80. The housing 50 corresponds to the housing 10 of the waterproof terminal block 1, the packing 60 corresponds to the packing 20 of the waterproof terminal block 1, the holder 70 corresponds to the holder 30 of the waterproof terminal block 1, and the terminal 80 corresponds to the terminal 40 of the waterproof terminal block 1. That is, the basic configuration of the waterproof terminal block 2 is equivalent to the basic configuration of the waterproof terminal block 1. In the following description of the waterproof terminal block 2, the contents overlapping with the description of the waterproof terminal block 1 will be omitted accordingly.

The housing 50 includes three terminal insertion holes 53, three packing fitting recesses 54, and three holder housing recesses 55. The terminal insertion holes 53 correspond to the terminal insertion holes 13 of the waterproof terminal block 1, the packing fitting recesses 54 correspond to the lower parts 15 of the packing fitting recesses 14 of the waterproof terminal block 1, and the holder housing recesses 55 correspond to the upper parts 16 of the packing fitting recesses 14 of the waterproof terminal block 1. In this embodiment, there is no part corresponding to the holder fitting recesses 18 of the waterproof terminal block 1.

The housing 50 has two partition walls 57 corresponding to the partition walls 17 of the waterproof terminal block 1. The partition walls 57 demarcate the packing fitting recesses 54 adjacent to each other and the holder housing recesses 55 adjacent to each other. The partition walls 57 have a first partition wall section 57*a*, which is thick-walled section, and a second partition wall section 57*b* thinner than the first partition wall section and protrudes at an upper end of the first partition wall section 57*a*.

Like the second partition wall section 17*b* of the waterproof terminal block 1, the second partition wall section 57*b* is a cutting blade part for cutting a connecting part 64 connecting frame parts 62 of adjacent annular sealing parts 61 of the packing 60 described later. Further, in the second embodiment, a tip 57*c* of the second partition wall section 57*b* is a groove portion in which at least a part of an end part 72*c* of a lower separation part 72*b* included in a separation part 72 of the holder 70 described later can enter. In the second embodiment, a shape of the end part 72*c* is a chevron including a ridge line. Therefore, the groove shape of the tip 57*c* may be such that the cross section orthogonal to an extending direction of the groove part has a so-called V-shape so as to face the chevron of the end part 72*c* in the vertical direction.

Figure 8:
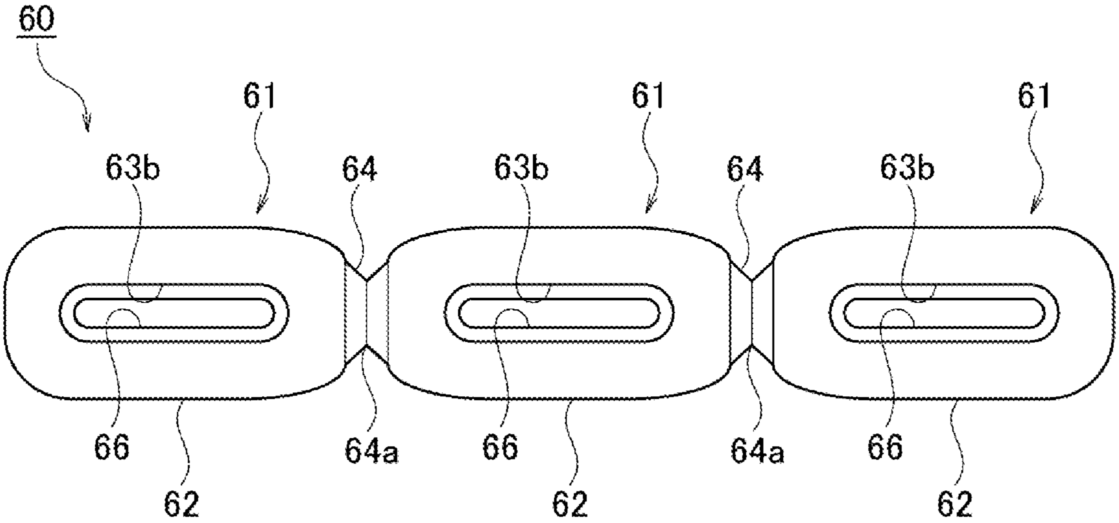
FIG. 8 is a plan view of a packing used for the waterproof terminal block according to the second embodiment.
Figure 9:
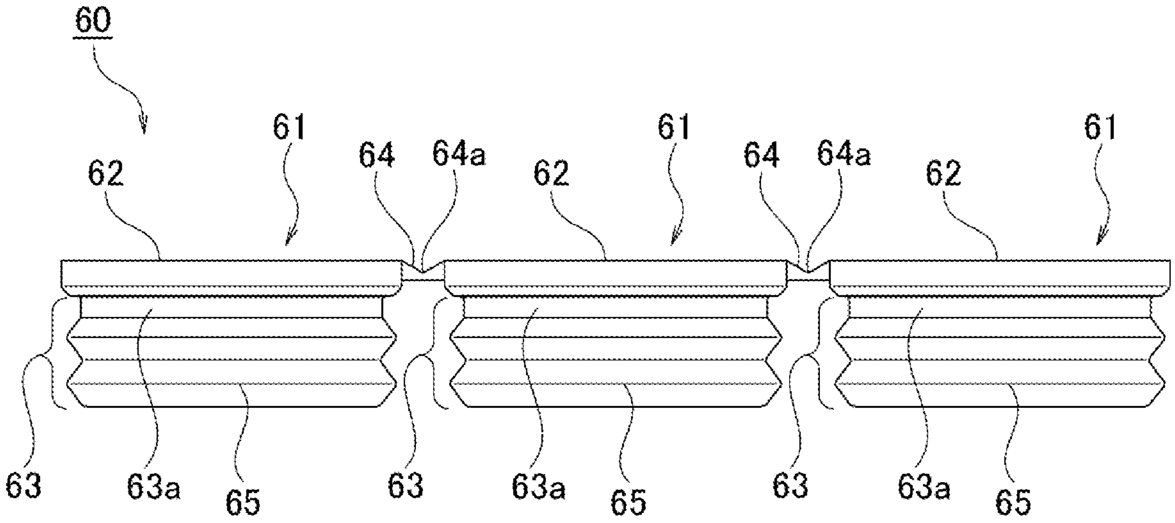
FIG. 9 is a front view of the packing according to the second embodiment.

FIG. 8 is a plan view of the packing 60. FIG. 9 is a front view of the packing 60.

The packing 60 is configured to fit into the packing fitting recesses 54 of the housing 50 from the upper side. The packing 60 is molded from a flexible resin material such as rubber, for example, and has three annular sealing parts 61 into which the terminals 80 are inserted and sealed. The sealing parts 61 each have the frame part 62 and an elliptical annular part 63 integrally formed on a lower side of the frame part 62 into which the terminals 80 are inserted and sealed. The sealing parts 61 adjacent to each other are connected by the connecting part 64. Specifically, the frame parts 62 included in the two sealing parts 61 adjacent to each other are connected by the connecting part 64. The connecting part 64 in the second embodiment has a groove part 64*a* such that a width of a center part is narrow in plan view as illustrated in FIG. 8, and a thickness of the center part is thin in front view as illustrated in FIG. 9. That is, the packing 60 is formed integrally by connecting the three sealing parts 61 with the two connecting parts 64. As illustrated in FIG. 7, the frame part 62 of the sealing parts 61 is fitted into the packing fitting recess 54.

The elliptical annular part 63 has an outer lip part 65 and an inner lip part 66. The outer lip part 65 is provided on an outer peripheral surface 63*a* and comes into close contact with the packing fitting recess 54 of the housing 50 when the packing 60 is assembled to the housing 50. The inner lip part 66 is provided on an inner peripheral surface 63*b* and comes into close contact with the terminal 80 when the terminal 80 is assembled to the packing 60.

As illustrated in FIG. 7, the holder 70 has three annular terminal insertion parts 71 in parallel, each having an insertion space part 71*a* into which the terminal 80 is inserted. The terminal insertion parts 71 adjacent to each other are integrally connected through the separation parts 72. The separation parts 72 have an upper separation protrusion 72*a* corresponding to the upper separation protrusion 32*a* of the waterproof terminal block 1, and a lower separation part 72*b* located at the lower portion of the upper separation protrusion 72*a* and continuous with the upper portions of the terminal insertion parts 71 adjacent to each other (see FIG. 10). As illustrated in FIG. 7, in the second embodiment, when the packing 60 and the holder 70 are assembled to the housing 50, only the second partition wall section 57*b* of the housing 50 enters between the terminal insertion parts 71 adjacent to each other. That is, the lower end surface of the terminal insertion part 71 is in contact with the upper surface of the frame part 62 of the scaling part 61 in the packing 60.

In the second embodiment, the end part 72*c* of the lower separation part 72*b* in the separation part 72 is a protrusion including a ridge line. In this case, when the packing 60 and the holder 70 are assembled to the housing 50, the end part 72*c* faces and abuts against the tip 57*c* of the second partition wall section 57*b* which has cut the connecting part 64.

In addition, the holder 70 has a projection portion 73 (see FIG. 10) projecting upward on a part of the upper end surface of each of the three terminal insertion parts 71.

As illustrated in FIG. 7, the terminal 80 is a plate-like bus bar similar to the terminal 40 of the waterproof terminal block 1. The upper and lower ends of the terminal 80 are connection parts 81 and 82 in which connection holes 81*a* and 82*a* are formed. Here, in the second embodiment, the terminal 80 has a curved plate part 83 in which a through hole 83*a* is formed between an upper portion on a side of the connection portion 81 and a lower portion on a side of the connection portion 82. In the second embodiment, when the packing 60, the holder 70 and the terminal 80 are assembled to the housing 50, the projection portion 73 of the holder 70 engages with the through hole 83*a* of the terminal 80. As a result, the dropping of the holder 70 from the waterproof terminal block 2 is suppressed.

Next, the effect of the waterproof terminal block 2 will be described.

In the waterproof terminal block 2, the partition wall 57 of the housing 50 may have the first partition wall section 57*a* and the second partition wall section 57*b*. The separation part 72 of the holder 70 may have the upper separation protrusion 72*a* and the lower separation part 72*b* located at the lower portion of the upper separation protrusion 72*a* and continuous with the upper portions of the terminal insertion parts 71 adjacent to each other. With the lower end surface of the terminal insertion part 71 in contact with the upper surface of the frame part 62 of the sealing part 61 in the packing 60, the connecting part 64 may be cut with the second partition wall section 57*b* as a cutting blade part inserted between the terminal insertion parts 71 adjacent to each other.

According to the waterproof terminal block 2, even if the contact state between the packing 60 and the holder 70 is different from the waterproof terminal block 1 according to the first embodiment, the waterproof terminal block 1 has the same effect as the waterproof terminal block 1.

In the waterproof terminal block 2, one of the end part 72*c* of the lower separation part 72*b* and the tip 57*c* of the second partition wall section 57*b* may be a protrusion including a ridge line, and the other may be a groove part in which at least a part of the protruding portion can be entered. The tip 57*c* of the second partition wall section 57*b* may come into contact with the end part 72*c* of the lower separation part 72*b* after cutting the connecting part 64.

Figure 10:
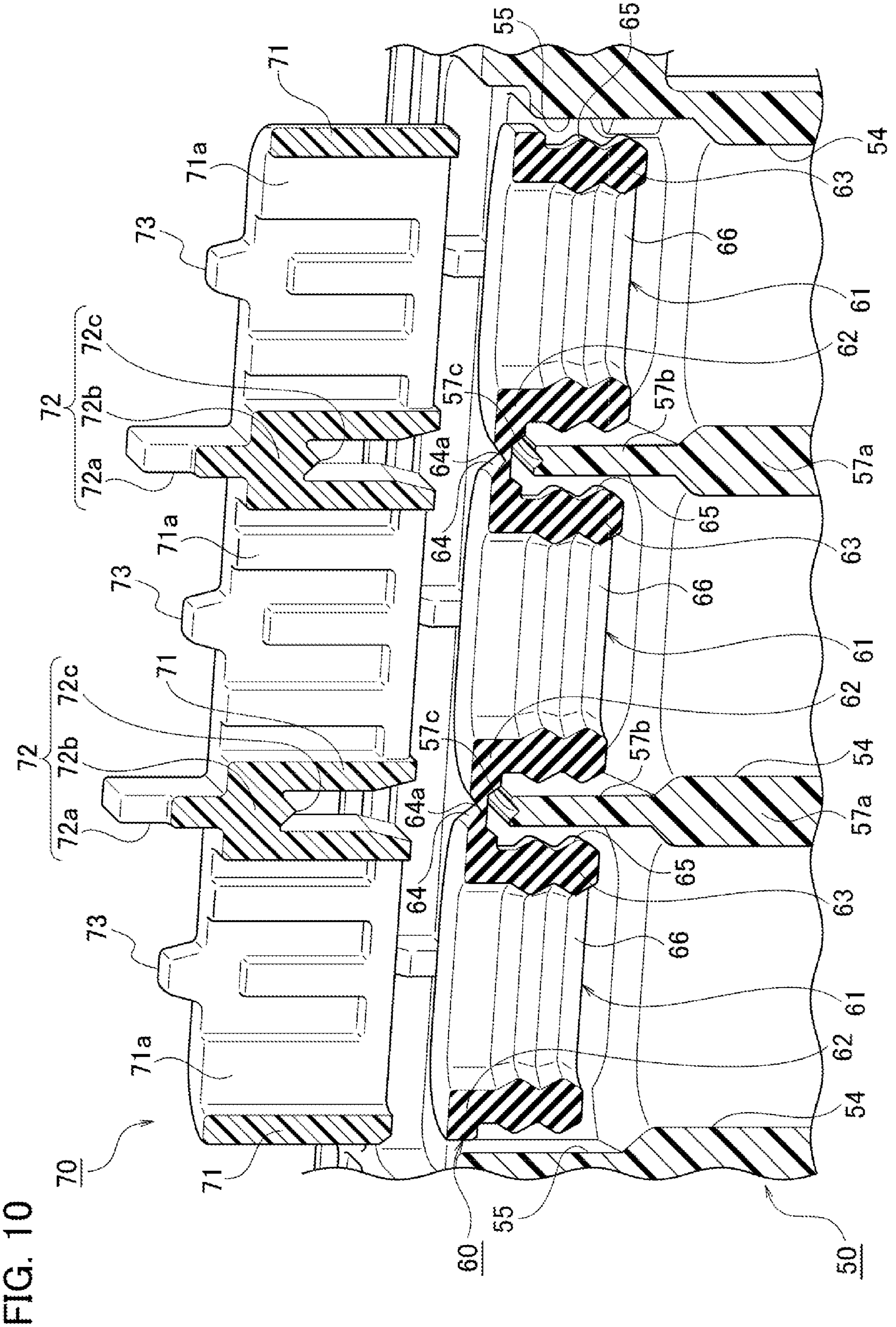
FIG. 10 is a cross-sectional view of a state before assembling a holder or the like according to the second embodiment.
Figure 11:
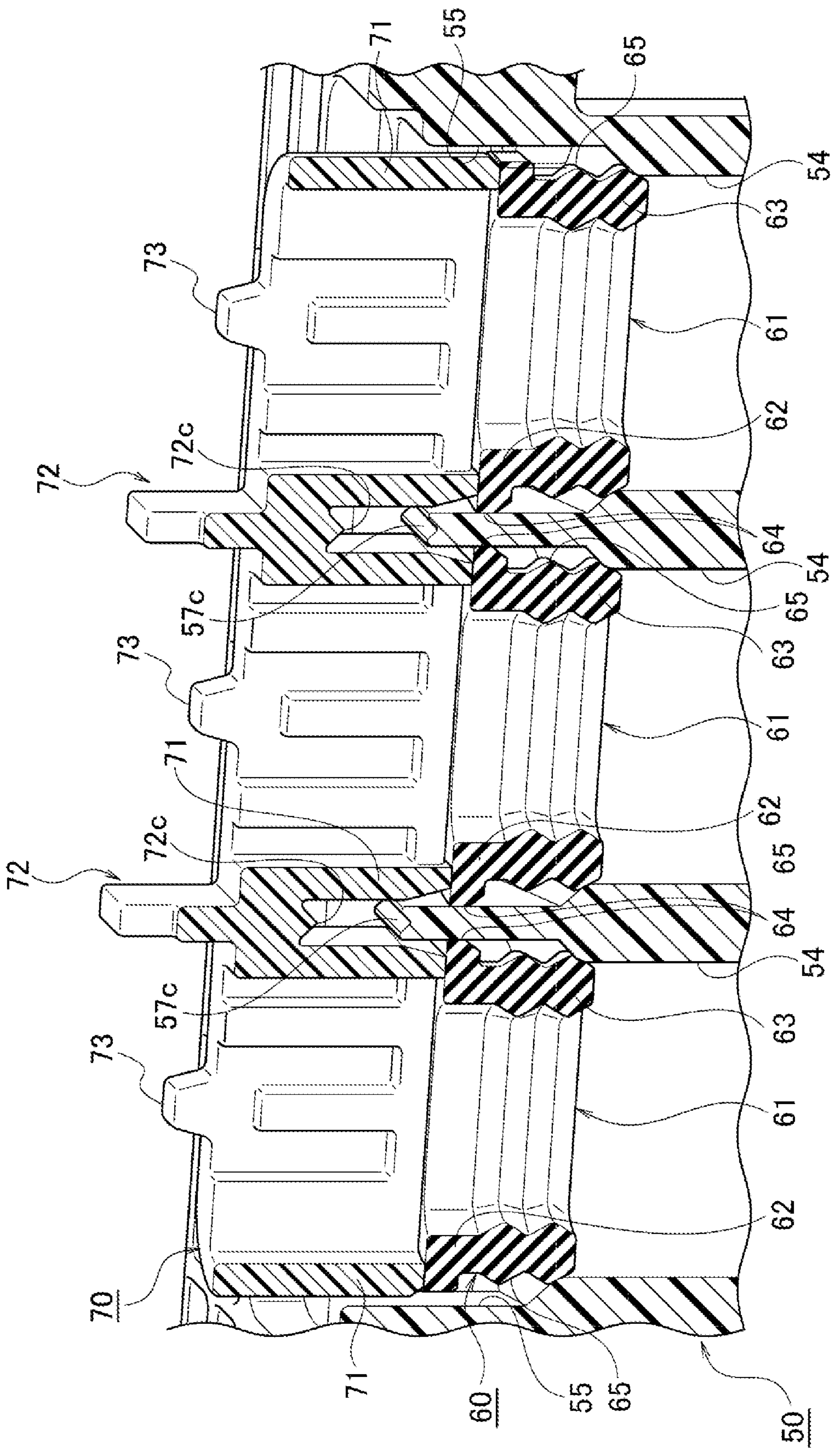
FIG. 11 is a cross-sectional view of a state assembling the holder or the like according to the second embodiment.
Figure 12:
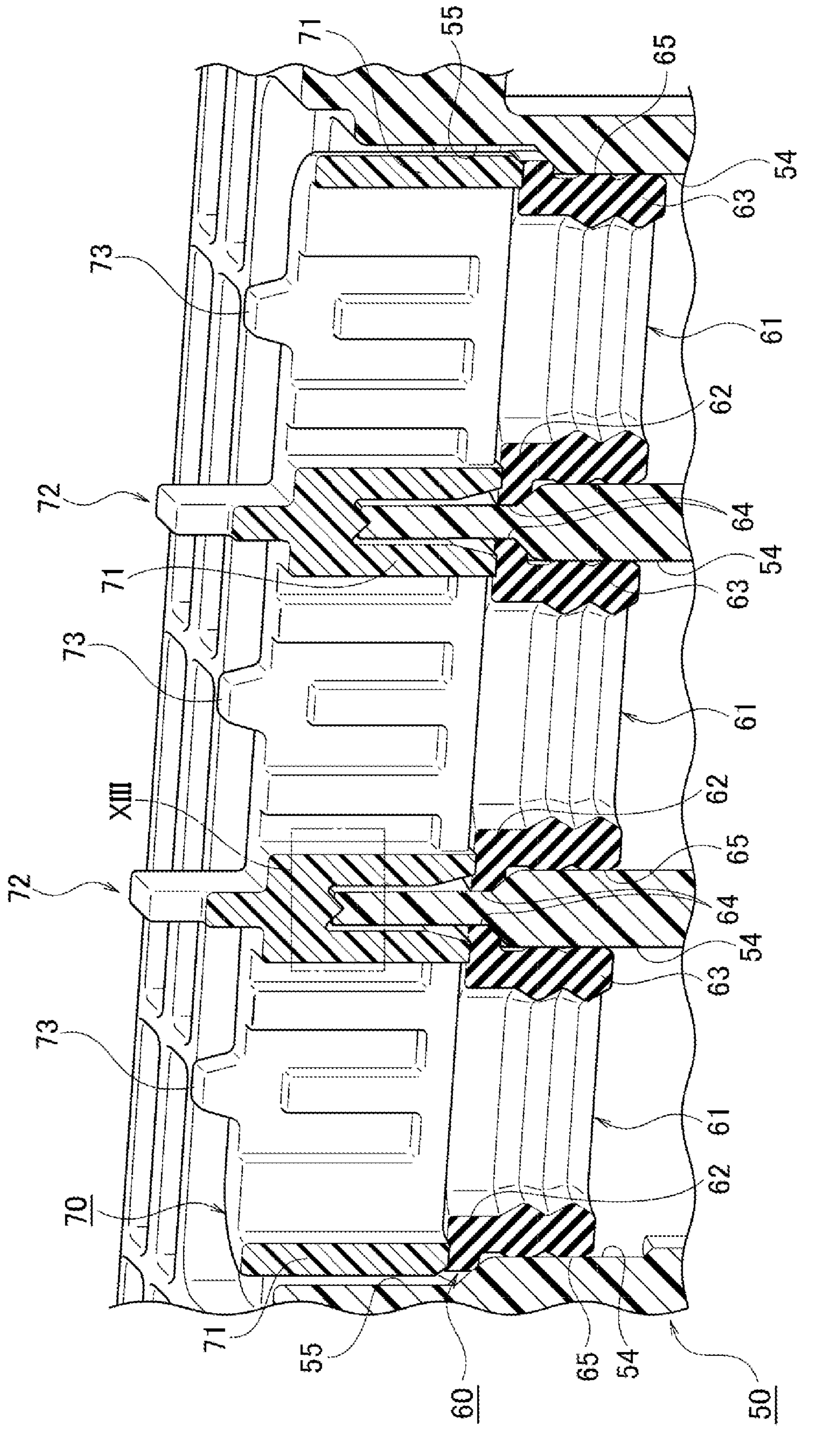
FIG. 12 is a cross-sectional view of a state in which the holder or the like is assembled in the second embodiment.

FIGS. 10, 11, and 12 are cross-sectional perspective views illustrating a state in which the packing 60 and the holder 70 are assembled to the housing 50 in time series in the waterproof terminal block 2. In the following description, an assembly work of the packing 60 and the holder 70 to the housing 50 is performed by an operator as an example.

FIG. 10 is a diagram illustrating a state of the packing 60 and the holder 70 when the assembly work is started. In the state illustrated in FIG. 10, the packing 60 is in a state in which the three sealing parts 61 are integrated. The operator places the packing 60 on the housing 50 so that each sealing part 61 is individually accommodated in the corresponding holder housing recess 55. At this time, the two connecting parts 64 face the tip 57*c* of the second partition wall section 57*b* in the vertical direction. Next, the operator prepares the holder 70 above the packing 60 so that the three terminal insertion parts 71 included in the holder 70 face the three sealing part 61 of the packing 60 in the vertical direction. At this time, the respective end parts 72*c* of the two lower separation parts 72*b* face the respective connecting parts 64.

FIG. 11 is a view illustrating a state in which the operator presses the holder 70 against the packing 60 from the state illustrated in FIG. 10. When the packing 60 is pressed by the holder 70, each elliptical annular part 63 starts to enter while adhering to the packing fitting recess 54 of the housing 50. In accordance with the approach, the tip 57*c* of the second partition wall section 57*b* starts to contact with the connecting part 64, and then, as illustrated in FIG. 11, the connecting part 64 is cut. Here, since the tip 57*c* of the second partition wall section 57*b* is a groove part, both ends along the extension direction of the groove part have a relatively sharp shape, and since the amount of extension of the connecting part 64 can be increased, the connecting part 64 can be cut more surely. Subsequently, the second partition wall section 57*b* having cut the connecting part 64 enters between the terminal insertion parts 71 adjacent to each other.

Figure 13:
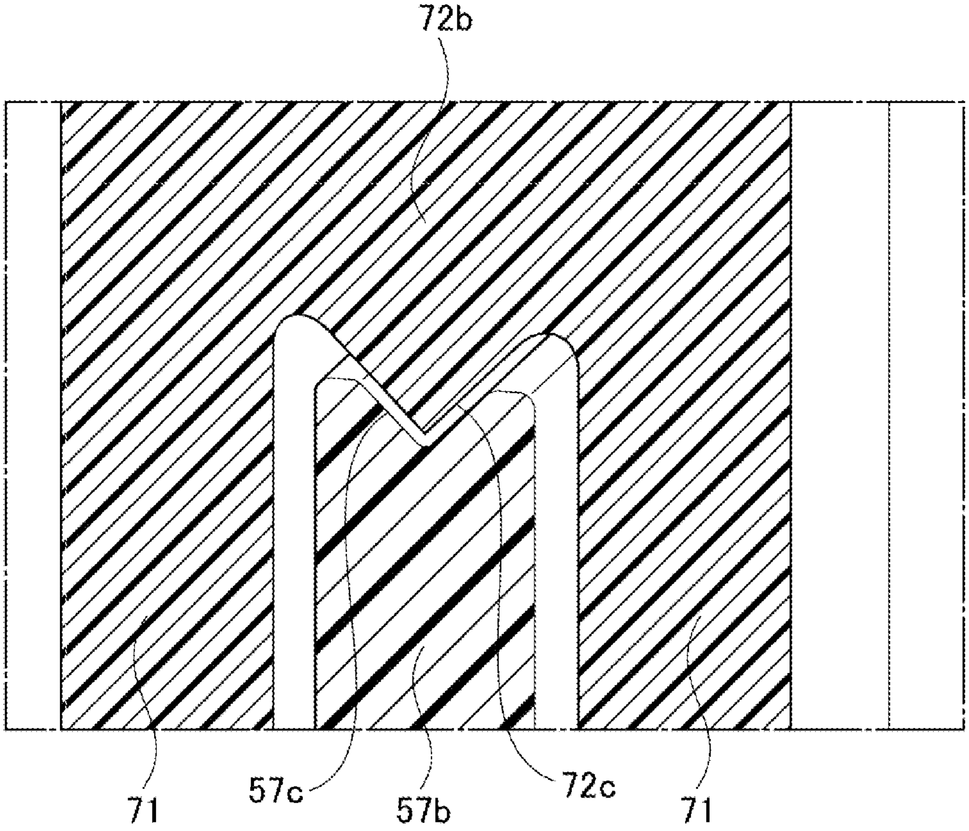
FIG. 13 is an enlarged partial cross-sectional view of part XIII of FIG. 12.

FIG. 12 is a view illustrating a state in which the operator pushes the holder 70 against the packing 60 further from the state illustrated in FIG. 11, and finally the assembly of the packing 60 and the holder 70 against the housing 50 is completed. FIG. 13 is an enlarged partial cross-sectional view of the part XIII in FIG. 12. First, each elliptical annular part 63 of the packing 60 is fitted into the packing fitting recess 54 of the housing 50 while the outer lip part 65 is in close contact with the packing fitting recess. On the other hand, the holder 70 is maintained with the lower end surface of the terminal insertion parts 71 in contact with the upper surface of the frame part 62 of the scaling part 61 of the packing 60. At this time, as illustrated in FIG. 13, each end part 72*c* as a projection in the two lower separation parts 72*b* of the holder 70 is at least partially inserted into the tip 57*c* as a groove part in the second partition wall section 57*b*. Therefore, while movement in the vertical direction is regulated by the terminal 80, movement in the direction orthogonal to the vertical direction is also regulated, so that the holder 70 is held in the housing 50 more stably.

In the above example, the end parts 72*c* of the lower separation part 72*b* in the holder 70 is, for example, a chevron-shaped projection, and the tip 57*c* of the second partition wall section 57*b* in the housing 50 is, for example, a groove part having a V-shaped cross section. On the other hand, the tip 57*c* of the second partition wall section 57*b* may be a projection, and the end part 72*c* of the lower separation part 72*b* may be a groove part. In this case, since the tip 57*c* of the second partition wall section 57*b* as the cutting blade part becomes a projection including a sharp edge, the connecting part 64 can be cut more reliably.

In the waterproof terminal block 2, the connecting part 64 may have the groove part 64*a* having a thin thickness at the center part in the direction in which the plurality of sealing parts 61 are aligned.

In this case, when the connecting part 64 is cut, the edge of the projection formed at one of the end part 72*c* of the lower separation part 72*b* or the tip 57*c* of the second partition wall section 57*b* easily enters the groove part 64*a*. Therefore, according to the waterproof terminal block 2, the connecting parts 64 can be more easily cut.

Although some embodiments have been described above, the embodiments are not limited to these, and various variations are possible within the scope of the outline of the embodiments.

That is, according to the above embodiment, the packing 20 or the like is provided with three annular sealing portions such as the sealing parts 21, but two or more annular sealing portions may be provided.

According to the above embodiment, the terminals 40 or the like are formed in a straight or straight plate shape, but may be bent in an L-shaped plate shape.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A waterproof terminal block comprising:

a housing in which a plurality of terminal insertion holes are formed at a lower side of the housing and a plurality of packing fitting recesses partitioned by a partition wall at an upper side of the housing;

a plurality of terminals configured to be inserted into and attached to the plurality of terminal insertion holes;

a packing comprising a plurality of sealing parts configured to seal the plurality of terminals inserted into the plurality of sealing parts and to fit into the plurality of packing fitting recesses, each sealing part having an annular shape; and a holder having a plurality of terminal insertion parts separated by a separation part, each terminal insertion part having an annular shape, and configured to hold the packing by bringing the plurality of terminal insertion parts into contact with the packing from the upper side, wherein the packing comprises connecting parts connecting adjacent sealing parts of the plurality of sealing parts to each other to be formed integrally, and the partition wall has a cutting blade part configured to cut a connecting part of the connecting parts of the packing when assembling the plurality of terminals, the packing, and the holder to the housing.

2. The waterproof terminal block according to claim 1, wherein the partition wall includes a first partition wall section and a second partition wall section thinner than the first partition wall section, the separation part includes an upper separation protrusion and a lower separation recess, the lower separation recess arranged on the lower side of the upper separation protrusion in a state the holder being assembled to the housing, the cutting blade part is provided at the second partition wall section configured to enter the lower separation recess when the connecting part between adjacent seal parts of the packing is in a state being sandwiched and held in the lower separation recess between adjacent terminal insertion parts of the holder.

3. The waterproof terminal block according to claim 1, wherein the partition wall includes a first partition wall section and a second partition wall section thinner than the first partition wall section, the separation part includes an upper separation protrusion and a lower separation part, the lower separation part arranged on the lower side of the upper separation protrusion in a state the holder being assembled to the housing and continuous with the upper side of the terminal insertion part adjacent to each other, the cutting blade part is provided at the second partition wall section configured to enter between the terminal insertion parts adjacent to each other in a state the lower end surface of the terminal insertion part is in contact the upper surface of the seal part of the packing.

4. The waterproof terminal block according to claim 3, wherein one of an end part of the lower separation part and a tip of the second partition section is a projection with a ridge line, and the other is a groove configured so as at least a part of the projection to enter into the groove, and the tip of the second partition section abuts the end part of the lower separation part by cutting the connecting part.

5. The waterproof terminal block according to claim 1, wherein the connecting part is a strip extending along a direction in which the plurality of seal parts are aligned.

6. The waterproof terminal block according to claim 1, wherein the connecting part has a groove part having a thinner thickness at a center part in a direction in which the plurality of seal parts are aligned.

7. The waterproof terminal block according to claim 1, wherein on an outer peripheral surface of each of the plurality of seal parts, an outer lip part configured to closely attach to a packing fitting recess of the plurality of packing fitting recesses of the housing is provided, and on an inner peripheral surface of each of the plurality of seal parts, an inner lip part configured to closely attach to a terminal of the plurality of terminals is provided.

* * * * *